Dec. 25, 1934.  H. I. GRUBBS  1,985,447
VALVE LIFTER
Filed June 25, 1931  4 Sheets-Sheet 1

Inventor
H. I. Grubbs
By Lacey & Lacey,
Attorneys

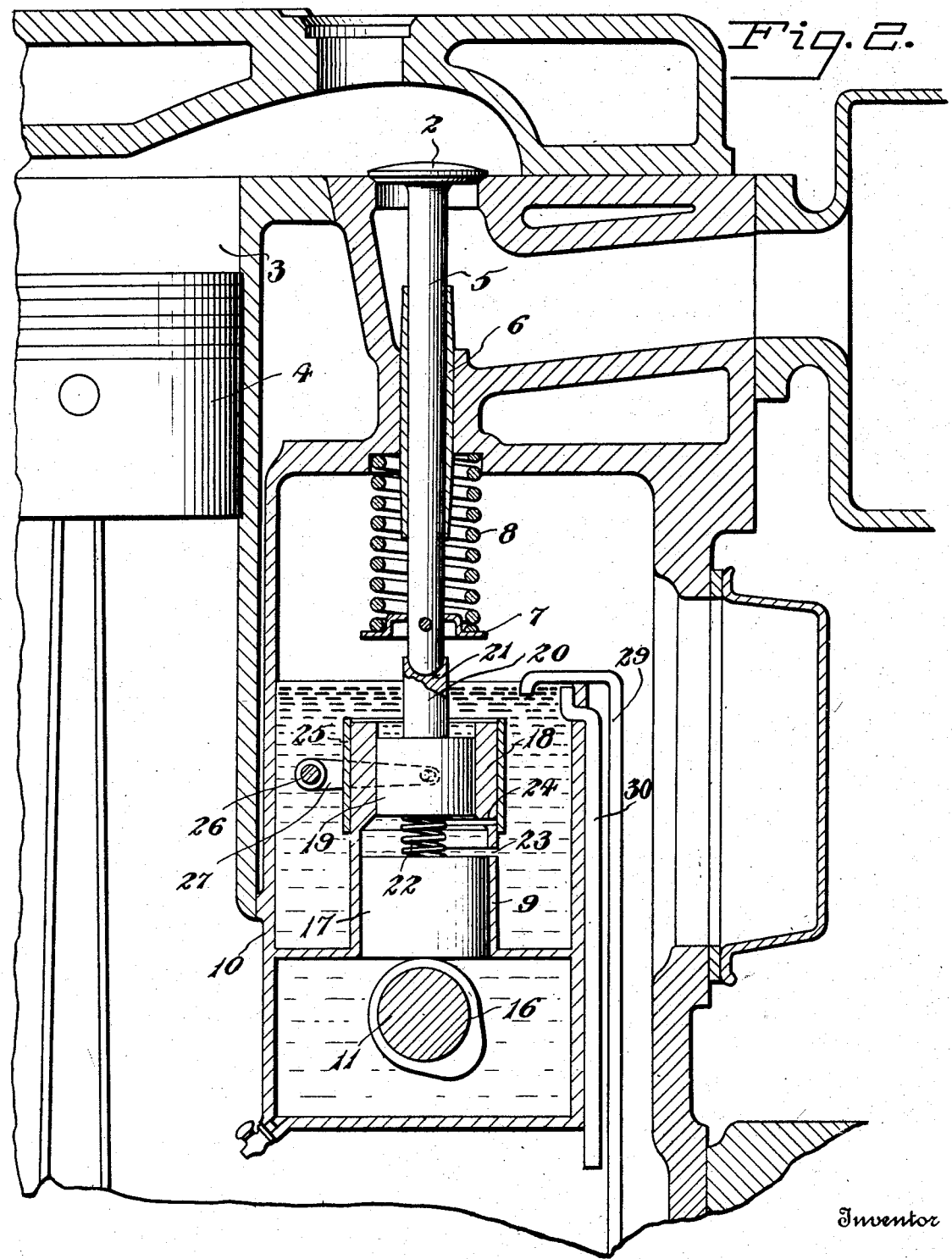

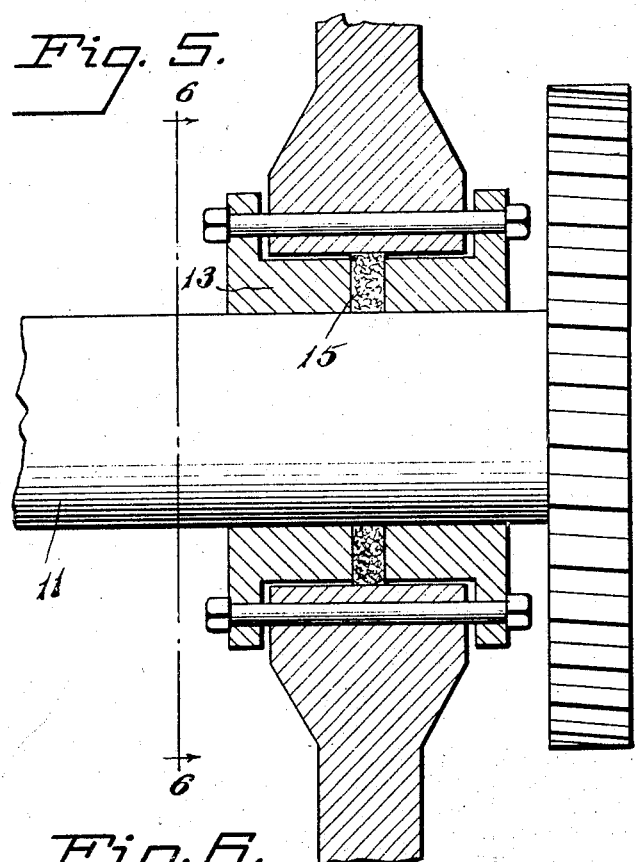
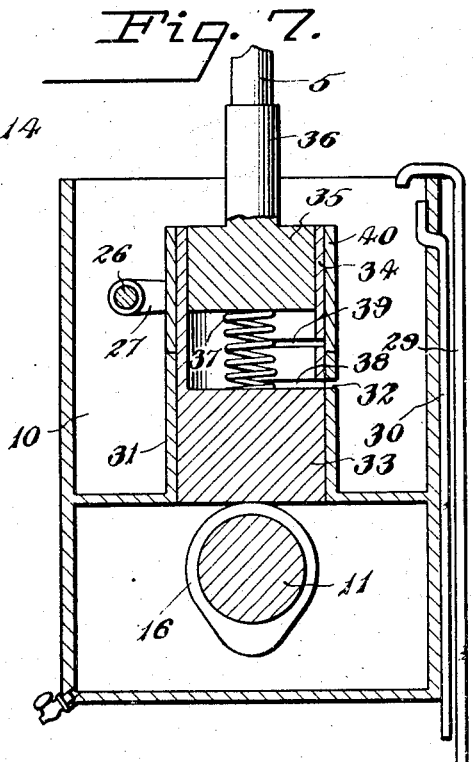
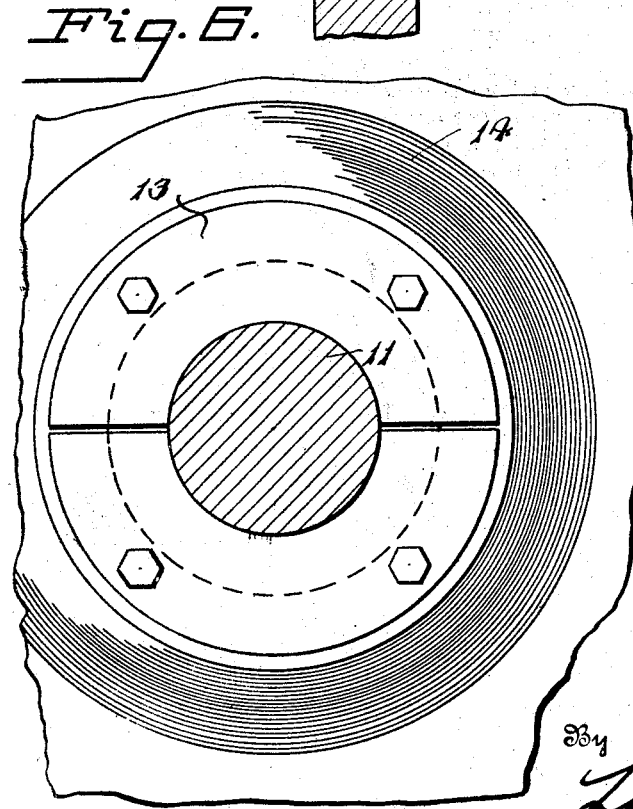
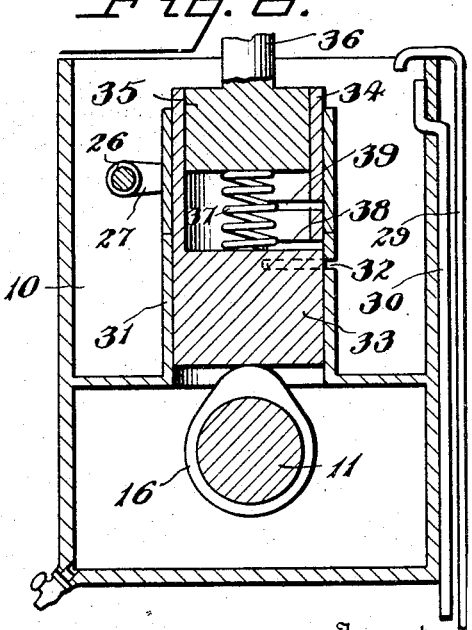

Dec. 25, 1934.  H. I. GRUBBS  1,985,447
VALVE LIFTER
Filed June 25, 1931  4 Sheets-Sheet 4
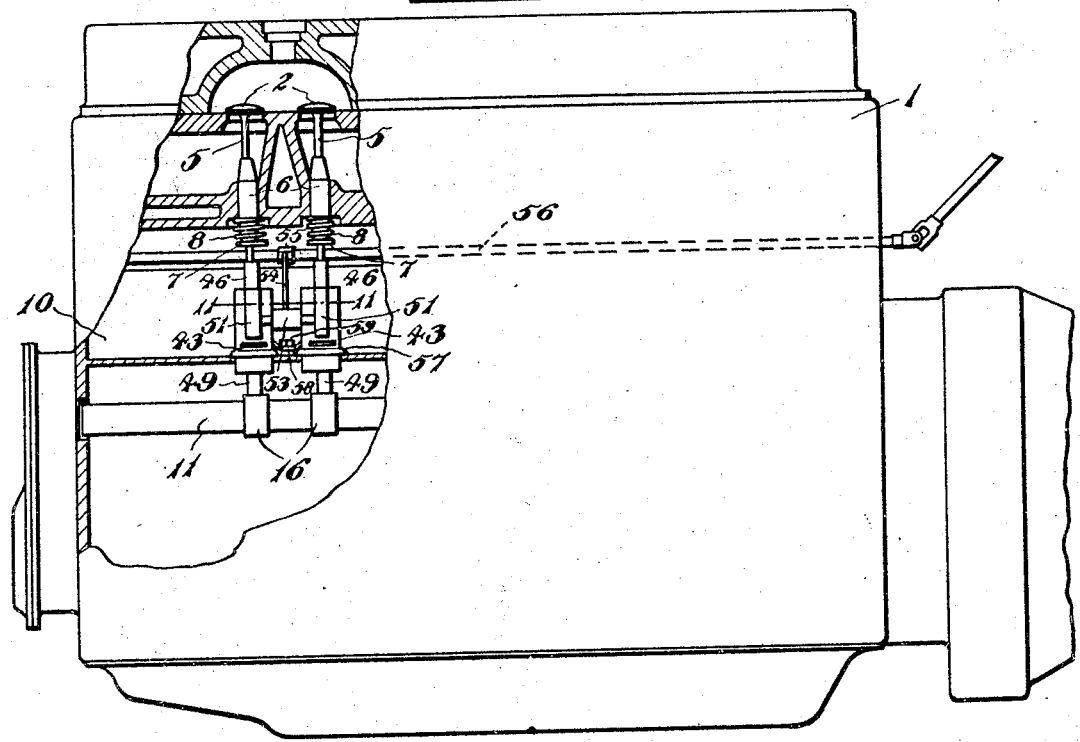
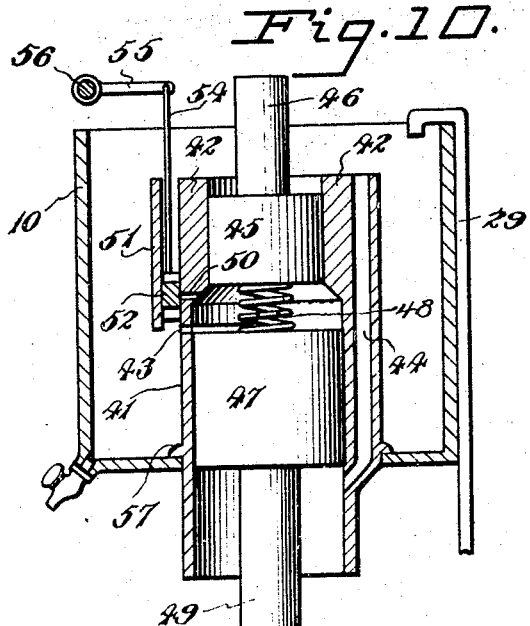
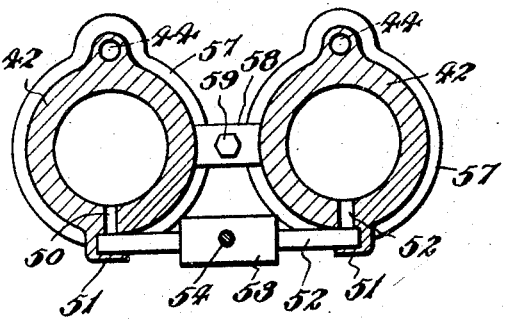
Inventor
H. I. Grubbs
By Lacey & Lacey, Attorneys Patented Dec. 25, 1934

1,985,447

UNITED STATES PATENT OFFICE 1,985,447

VALVE LIFTER

Hayward I. Grubbs, El Monte, Calif.

Application June 25, 1931, Serial No. 546,868

6 Claims. (Cl. 123—90)

This invention relates to internal combustion engines and more particularly to valve actuating means whereby valves of the puppet type may be opened and closed noiselessly.

One object of the invention is to provide novel valve actuating mechanism adapted to be disposed beneath puppet valves of conventional construction and operated by the usual cam shaft, the actuating mechanism being so formed that opening and closing of the valve may be controlled in a very effective manner.

Another object of the invention is to provide means whereby liquid between the upper and lower pistons may be allowed to escape from the cylinder when the lower piston moves upwardly and thereby permit the engine to run idle without the valves opening and closing when so desired.

Another object of the invention is to permit oil used for lubricating an engine to be delivered into chambers in which the cylindrical guide sleeves are mounted for use to fill the space between the upper and lower pistons and surplus oil returned from the chambers to the lower portion of the engine casing.

Figure 1:
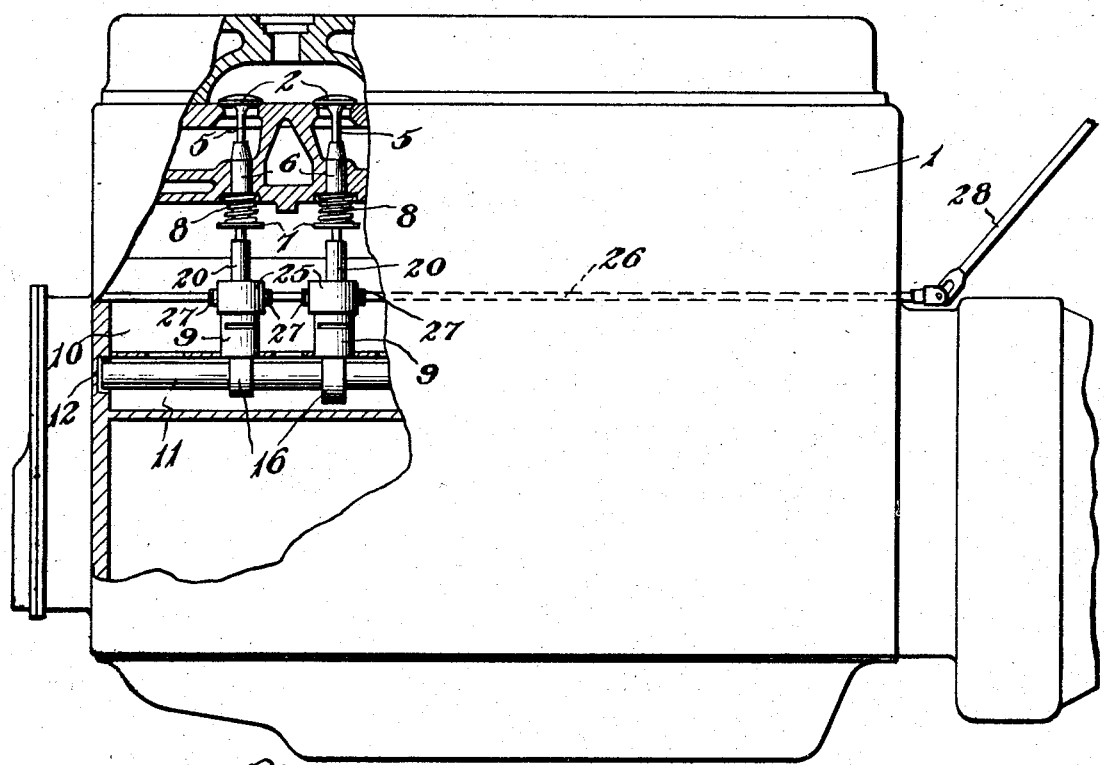
Figure 3:
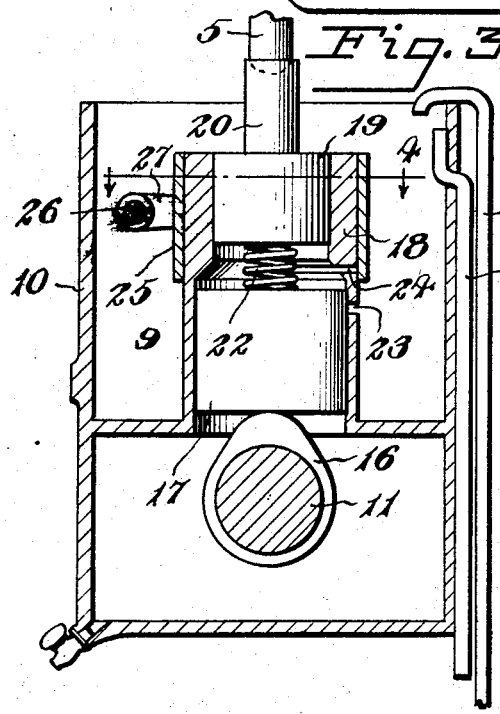
Figure 4:
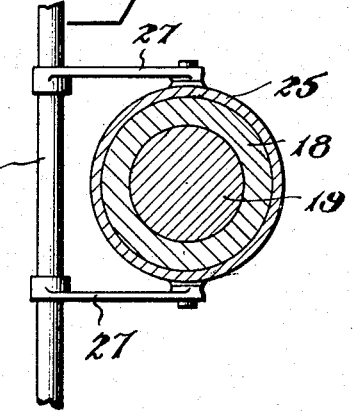

The invention is illustrated in the accompanying drawings, wherein:

Figure 1 is a view showing an engine in side elevation with portions broken away to show the improved valve operating means, Figure 2 is an enlarged sectional view showing the construction of the improved valve operating mechanism, Figure 3 is a sectional view through the valve operating mechanism of Figure 2 with the pistons moved upwardly to open a valve, Figure 4 is a sectional view taken along the line 4—4 of Figure 3, Figure 5 is a fragmentary view illustrating the manner in which one end of the cam shaft is rotatably mounted.

Figure 6 is a sectional view taken along the line 6—6 of Figure 5,

Figure 7 is a vertical sectional view through a modified form of valve actuating mechanism, Figure 8 is a view similar to Figure 7 showing the pistons moved upwardly, Figure 9 is a view similar to Figure 1 showing another modified form of valve actuating mechanism, Figure 10 is a vertical sectional view through the valve actuating mechanism of Figure 9, and Figure 11 is a sectional view taken along the line 11—11 of Figure 9.

The engine shown in Figure 1 and indicated in general by the numeral 1 is in most respects of a conventional construction and is equipped with the usual puppet valves 2 and also with the usual cylinders 3 in each of which is mounted a piston 4. The puppet valves are disposed vertically and each has its stem 5 slidably mounted through the usual guide 6 and adjacent its lower end each valve stem carries a collar 7 constituting an abutment for the lower end of a spring 8 which serves to yieldably retain the valve in a closed position and returns the valve to the closed position after being opened.

Beneath the valves are located cylinders or sleeves 9 which are mounted in a chamber 10 extending longitudinally of the engine. The cam shaft 11 extends longitudinally of the engine through the chamber 10 with one end mounted in a thrust bearing 12 and its other end rotatably engaged through a split bearing 13 and carrying a gear 14 by means of which rotary motion may be imparted to the cam shaft in the usual manner. The split bearing 13 not only serves to rotatably mount one end of the cam shaft, but since it includes packing 15 it will serve to prevent oil from escaping from the chamber 10 about this end of the shaft.

The cams 16 which are carried by the cam shaft 11 are located beneath the sleeves or cylinders and bear against the lower ends of working pistons 17 which are slidably mounted in the lower portions of the sleeves. The upper portion of each sleeve is internally thickened as shown at 18 and in this reduced portion is slidably mounted a piston 19 having an upwardly extending neck 20, the upper end of which is hollowed to form a cup or seat 21 into which fits the lower end of a valve stem. It will thus be seen that when the valve-engaging piston 19 is forced upwardly, the valve engaged thereby will be moved off its seat after which the spring 8 will serve to move the valve stem and valve-engaging piston downwardly and return the valve to a closed position. A coil spring 22 which is of considerably less strength than the spring 8 is disposed between the upper and lower pistons and serves to retain the lower piston in engagement with its cooperating cam and cause the lower piston to be yieldably held in spaced relation to the upper piston and follow the cam downwardly as the cam shaft rotates.

A circumferentially extending slot 23 is formed in one side portion of the cylinder or sleeve 9 substantially flush with the upper end of the lower piston when the piston is in its lowered position shown in Figure 2 and above this slot is formed another slot 24 which is cut through the lower end of the thickened portion 18 below the lower end of the upper piston when in its lowered position. This upper slot is normally closed by a sleeve 25 which fits snugly about the upper portion of the cylinder 9, and in order that the sleeve may be moved upwardly to uncover the upper slot there has been provided a shaft 26 which extends longitudinally through the motor and carries arms 27 which project from the shaft and are pivoted to the respective sleeves as shown in Figures 1 and 4. An actuating rod 28 is connected with the shaft 26 to extend into the body portion of an automobile where it may be easily reached by the driver and turned in order to rotate the shaft when the sleeves are to be adjusted.

By this arrangement oil with which the chamber 10 is filled may flow into the several cylinders through the slots 23 in order to fill the space between the upper and lower pistons, and when the sleeves 25 are moved upwardly to uncover the slots 24, oil may be forced outwardly through the slots 24 as the lower pistons move upwardly without imparting motion to the upper pistons. Oil is delivered into the chamber from the lower portion of a crank case of an engine by a suitable pump through a pipe 29 and an overflow pipe 30 is provided so that surplus oil may drain out of the chamber and back into the crank case of the motor.

When the motor is in operation, the cam shaft 11 is rotated in timed relation to the crank shaft and as the cam shaft rotates, the cams 16 act upon the lower pistons. As each lower piston moves upwardly it closes the slot 23 in its cylinder 9 and the mass of oil confined between the two pistons will cause the upper piston to be moved upwardly against the action of the spring 8 and the valve will be opened. As the cam shaft continues rotation and the cam moves from the position shown in Figure 3 towards that of Figure 2, the spring 8 will force the valve stem and upper piston downwardly to close the valve and the spring 22 will cause the lower piston to follow the cam downwardly until the lower piston has reached the position of Figure 2 in which it is below the slot 23. A certain amount of oil will be forced out through the slot 23 as the pistons move upwardly, but this will be compensated for due to the fact that the upper portion of the cylinder 9 is internally thickened and the upper piston is of less diameter than the lower piston. As the slot 23 is uncovered when the lower piston moves downwardly, oil will flow inwardly through this slot and completely fill the space between the upper and lower pistons. In view of the fact that the two pistons are separated by liquid, the upper piston may be forced downwardly as far as necessary by the spring 8 in order to allow the valve 2 to seat properly and it is not necessary to use a gauge in order to provide proper clearance between the valve stem and the stem or neck 20 of the upper piston. When it is desired to have the motor run idle and act as a compressor to prevent an automobile from moving too rapidly down a steep hill, the rod 28 is turned to rotate the shaft 26, thereby causing the arms 27 to move the sleeves 25 upwardly a sufficient distance to uncover the slots 24. When these slots are uncovered, upward movement of the lower pistons instead of causing oil trapped between the pistons to force the upper pistons upwardly will cause oil to be forced out through the slots 24 and since the oil escapes through these slots, the upper pistons will remain stationary and the valves will be held closed by their springs. Since the valves do not open, the upper ends of the cylinders 3 will be tightly closed and the engine will act as a check upon the automobile.

In Figures 7 and 8 there has been shown a modified construction, certain portions corresponding to those previously described being indicated by corresponding numerals. In this form of the invention the cylinders or sleeves 31 which take the place of the cylinders 9 are shorter than the cylinders 9 and near their upper ends are formed with side openings or slots 32 corresponding to the slots 23. Each of the lower pistons 33 rests upon a cam 16, but has its upper portion extended to form annular walls 34 constituting an auxiliary cylinder in which the upper piston 35 is mounted. This upper piston which takes the place of the piston 19 has an upwardly extending neck 36 upon which the valve stem 5 rests and the underface of the upper piston is held in spaced relation to the upper face of the lower piston constituting a bottom for the auxiliary cylinder by a spring 37 which takes the place of the spring 22.

A slot 38 is formed in the walls of the auxiliary cylinder flush with the top or upper face of the lower piston to register with the slot 32 when the pistons are in a lowered position in order that oil may flow into the space between the upper and lower pistons where it will be trapped and cause the upper piston and valve to be moved upwardly when the lower piston is moved upwardly by the cam as shown in Figure 8. There has also been provided a slot 39 in the walls of the auxiliary cylinder which takes the place of the slot 24 and is normally closed by a sleeve 40 corresponding to the sleeve 25 and engaged by the arms 27 which project from the shaft 26. When the sleeve is in the lowered position shown in Figures 7 and 8, the oil will be trapped between the upper and lower pistons, but when this sleeve is raised sufficiently to dispose its lower edge above the highest point to which the slot 39 may move, upward movement of the lower piston will cause oil to be forced outwardly through this slot and prevent movement from being imparted to the upper piston and valve. Therefore an operation similar to that previously described may take place.

In the construction shown in Figures 9, 10 and 11, the cylinders 41 are somewhat similar to the cylinders 9 since they have inwardly thickened upper portions 42 and have slots 43 corresponding to the slots 23. These cylinders extend downwardly below the chamber 10 and at one side each is formed with a drain passage 44 open at its upper end for communication with the chamber and having its lower end opening into the cylinder below the bottom of the chamber as shown clearly in Figure 10.

The upper piston 45 which corresponds to the upper piston 19 is slidably mounted in the reduced upper portion of the cylinder and has an upstanding neck 46 to engage the lower end of a valve stem. The lower piston 47 is held in spaced relation to the upper piston by a spring 48 corresponding to the spring 22, but instead of this lower piston having direct engagement with the cam 16, it is provided with a depending neck or stem 49 which rests upon the cam. When the cam shaft rotates sliding motion is imparted to the lower piston to move it upwardly, and oil trapped in the cylinder will force the upper piston upwardly and lift the valve off its seat. Instead of providing each cylinder with a wide slot corresponding to the slot 24 and a sleeve to cover the same, each of the cylinders 42 is formed with a small opening 50 extending through the lower end of the inwardly thickened upper portion of the cylinder and each cylinder is formed with a flange 51 extending longitudinally of the cylinder at one side of the opening 50 and projecting transversely of the cylinder across this opening.

A strip 52 which serves as a valve extends between a pair of cylinders with its ends engaged between the cylinders and the flanges 51, as shown in Figure 11, and the intermediate portion of this valve strip is thickened as shown at 53 and engaged by a link or rod 54 which extends upwardly between the cylinders and has its upper end connected with an arm 55 projecting radially from a rod or shaft 56 corresponding to the shaft 26.

This shaft 56 extends longitudinally of the engine and is connected with an actuating rod and it will be readily understood that when the actuating rod is turned, rotary motion will be imparted to the rod or shaft 56 and the arms 55 projecting therefrom swung upwardly to exert pulling action upon the links 54 and move the valve strips upwardly a sufficient distance to uncover the openings 50 in the cylinders. The oil between the pistons may then be forced outwardly through these openings as the lower pistons move upwardly and the valves will remain closed.

The cylinders carry circumferentially extending flanges or beads 57 which rest upon the bottom of the chamber 10 about the openings through which the cylinders extend and the cylinders of each pair of cylinders are connected by a cross strip or bridge 58 perforated to receive a bolt 59 which is engaged in the bottom of the chamber 10. When the bolt is tightened, downward pressure is applied to the bridge and the cylinders will be firmly but releasably held in place.

What is claimed is:

1. In an engine, a spring-closed valve having its stem slidably mounted, a cylinder below the valve stem, a piston slidable in said cylinder and engaging the valve stem, a working piston slidable in said cylinder beneath the stem-engaging piston, a spring between said pistons yieldably holding the lower piston in spaced relation to the upper piston, a casing about said cylinder having liquid therein, said cylinder being formed with an opening in its walls between the pistons whereby liquid may flow from the casing into and fill space in the cylinder between the pistons when the pistons are lowered, an outlet for the liquid above said opening in the cylinder, a closure for said outlet whereby liquid may be trapped between the pistons, and means for imparting reciprocating motion to the lower piston to act upon the liquid and move the upper piston upwardly to open said valve when the lower piston moves upwardly.

2. In an engine, a spring-closed valve having its stem slidably mounted, a cylinder below the valve stem, a piston slidable in said cylinder and engaging the valve stem, a working piston slidable in said cylinder beneath the stem-engaging piston and held yieldably in spaced relation thereto, a casing about said cylinder having liquid therein, said cylinder being formed with an opening in its walls between the pistons whereby liquid may flow from the casing into the cylinder and fill space between the pistons, means to reciprocate the working piston, a second side opening being formed in the cylinder between the first side opening and lower end of the upper piston, a closure for the second side opening, and means to move the closure out of a closing position and allow liquid to escape from the cylinder without raising the upper piston when the lower piston moves upwardly.

3. In an engine, a spring-closed valve having its stem slidably mounted, a cylinder below the valve stem, a piston slidable in said cylinder and engaging the valve stem, a working piston slidable in said cylinder beneath the stem-engaging piston and yieldably held in spaced relation thereto, a casing about said cylinder having liquid therein, said cylinder being formed with an opening in its walls between the pistons whereby liquid may flow from the casing into the cylinder and fill space between the pistons, means for reciprocating the working piston, a second side opening being formed in the cylinder between the first side opening and lower end of the upper piston, a sleeve fitting snugly about said cylinder and slidable vertically thereon into and out of position to close the upper side opening, and means to shift said sleeve upwardly out of a closing position and allow liquid to escape from the cylinder without raising the upper piston when the lower piston moves upwardly.

4. In an engine, a spring-closed valve having its stem slidably mounted, a cylinder below the valve stem, a piston slidable in said cylinder and engaging the valve stem, a working piston slidable in said cylinder beneath the stem engaging piston and yieldably held in spaced relation thereto, a casing about said cylinder having liquid therein, said cylinder being formed with an opening in its walls between the pistons whereby liquid may flow from the casing into the cylinder and fill space between the pistons, means for reciprocating the working piston, a second side opening being formed in the cylinder between the first side opening and lower end of the upper piston, a sleeve fitting snugly about said cylinder and slidable vertically thereon into and out of position to close the upper side opening, a shaft extending horizontally in said casing and rockably mounted, arms extending from said shaft and pivoted to said sleeve at opposite sides thereof, and means to rotate said shaft and swing said arms upwardly to move the sleeve out of position to close the second side opening and allow liquid to escape from the cylinder without raising the upper piston when the lower piston moves upwardly.

5. In an internal combustion engine, a spring-closed puppet valve, a piston, means for operating said piston, a second piston coacting with the valve, a cylinder outside the pistons having an inlet to supply a liquid between the opposing faces of the pistons, and an outlet to permit escape of said liquid, and a movable closure for the outlet whereby the liquid may be trapped between the pistons to effect opening of the valve or may be permitted to escape whereby the first-mentioned piston may operate while the second piston remains at rest and the valve stays closed.

6. In an internal combustion engine, a spring-closed valve, a piston cooperating with the valve to open the valve, a second piston yieldably held in spaced relation to the first piston, means to reciprocate the second piston, a cylinder housing the pistons and having an opening to admit liquid to the space between the pistons, a second opening above said inlet opening, a cut-off mounted upon the exterior of the cylinder and normally covering the upper opening whereby liquid will be trapped between the pistons when the second piston moves upwardly, and means for shifting said cut-off whereby liquid may escape and the upper piston remain at rest when the lower piston moves upwardly.

HAYWARD I. GRUBBS. [L. S.]